Patented June 20, 1939

2,162,913

UNITED STATES PATENT OFFICE 2,162,913

PROCESS OF HYDRATING OLEFINS IN THE PRESENCE OF HETEROPOLY COMPOUNDS

James F. Eversole and Charles W. Rehm, Charleston, W. Va., assignors to Carbide and Carbon Chemicals Corporation, a corporation of New York No Drawing. Application December 24, 1935, Serial No. 56,082

29 Claims. (Cl. 260—641)

The present invention relates to a catalytic process, especially adapted for the hydration of olefins and ethers; and it has particular utility in connection with the production of aliphatic alcohols and ethers.

Processes are already known for the hydration of olefins to form corresponding alcohols in the presence of various hydration catalysts. Among catalysts found suitable for such catalytic hydration processes may be mentioned strong sulfuric and phosphoric acids; as well as solid catalysts, such as alumina.

The present invention is based upon the discovery that the hydration of olefins, and the resultant production of aliphatic alcohols and ethers in satisfactory yields, readily can be effected in the presence of certain inorganic complexes of high molecular weight, known as heteropoly compounds. These compounds, or mixtures thereof, may be utilized in the form of the free acids, or of their corresponding acid or neutral salts. While the hydration reaction preferably is conducted in the vapor phase, it is readily possible to carry out the reaction in the liquid phase by reacting a liquid or liquefied olefin and water in suitable proportions, in the presence of the hereindescribed catalyst present either in solid form or in aqueous or other solution.

In its broadest scope the invention comprises reacting an olefin and water or water vapor at elevated temperatures, and preferably at pressures above atmospheric, while in contact with a catalyst or reaction promoter comprising a heteropoly compound, either in solid form or in the form of an aqueous or other solution. The vaporous reaction products are withdrawn from the reaction vessel, and certain condensable components thereof are condensed, following which the alcohols and ethers may be separated from the condensate in well known manner by fractional distillation. The unreacted olefins separated from the reaction mixture by the said condensation may have admixed therewith additional water vapor and may be recycled in the process; or the olefins may be used for other purposes.

The olefins subjected to hydration may have in admixture therewith inert gases which are not reactive under the operating conditions, such as saturated hydrocarbons. Likewise, mixtures of olefins may be hydrated, with the resultant production of mixtures of various alcohols and ethers which readily may be separated and recovered from the reaction mixture by condensation and subsequent fractional distillation.

While normally vaporous olefins such as ethylene and propylene are effectively hydrated by the process, it will be understood that other olefins, including those normally liquid, likewise may be hydrated, with the production of the corresponding alcohols and ethers.

In the practice of the invention according to a preferred modification thereof, a vaporous mixture containing an olefin and a regulated amount of water vapor or steam is passed through a body composed of an aqueous or other solution of a heteropoly compound supported within a reaction zone that is maintained at a selected elevated temperature. This temperature will vary considerably in accordance with such factors as the particular olefin used, the hydration product desired, the pressure employed in the reaction zone, and other factors. Preferably the reaction is conducted under superatmospheric pressures. These may range upward to 5000 pounds per square inch. Pressures of from 500 to 3000 pounds per square inch are particularly suitable. Relatively high space velocities are generally used within the reaction zone when using superatmospheric pressures, in order to secure the highest efficiency and yields of the hydration products. The ratio of steam or water to olefin affects the character of the final products, high steam-olefin ratios favoring the formation of alcohols, and low ratios favoring ether formation.

The heteropoly acids, employed in connection with one form of the invention, are inorganic complexes of high molecular weight, comprising a nuclear element which is usually phosphorus, silicon, boron, or arsenic, surrounded by a coordinated group of other metallic oxide or oxides, such as the oxides of tungsten, molybdenum, vanadium, chromium, sulfur, selenium, and tellurium. Those compounds having twelve coordinated groups to one nuclear element generally are most stable. With combined and hydrating water these compounds have a molecular weight of near 3000. The acids are polybasic, apparently having usually 5 to 10 acid hydrogen atoms. Practically all of the acids are quite soluble in water.

Heteropoly acids in general may be formed by boiling an aqueous solution containing a salt of the metal which goes into the coordinated position and the acid of the metal or metalloid which goes into the nuclear position. On addition of an acid to the resulting solution, followed by shaking with an excess of ethyl ether, ethyl acetate or similar compound, a heavy liquid complex of heteropoly acid with the ether forms and settles out of the water solution. When ethyl ether is used, this heavy liquid layer contains a small amount of ethyl ether, an insufficient quantity of water to form the usual hydrated crystals of the heteropoly acid, and a large percentage of the heteropoly acid. It is sometimes found advantageous to employ the salt of the nuclear metal and the acid of the coordinated metal.

Thus silicotungstic acid having 12 coordinated groups to 1 nuclear group may be formed by boiling for a number of hours a solution containing sodium tungstate and silicic acid in excess of that required to supply silicon for the nuclear position of the amount of heteropoly acid that may be prepared from a given amount of the tungstate, cooling the solution and strongly acidifying it with an acid such as hydrochloric, sulfuric, or acetic acid, and shaking the resultant mixture with ethyl ether in amount sufficient to separate out all of the heteropoly acid, and to saturate with ether the water layer which forms below the ether layer upon standing. On settling, three layers form, the bottom layer being silicotungstic acid, water and ether. The resultant syrupy bottom layer is withdrawn and dried. The drying is not necessary where the acid is to be used in water solution.

Salts of heteropoly acids are formed by neutralizing the acids with the appropriate bases in the usual manner, or by the addition thereto of metallic salts which hydrolyze and yield a volatile acid removable by distillation. The few insoluble salts may be formed by precipitation from solutions of the corresponding acids or soluble salts in well known manner.

The following heteropoly compounds are among those suitable for use: silicotungstic acid, borotungstic acid, phosphotungstic acid, phosphomolybdic acid, phosphomolybdotungstic acid, tungstoarsenic acid; and salts thereof, such as the thorium, aluminum, tungsten, chromium, cadmium, and alkali metal salts of these acids. The silicotungstic compounds found particularly adapted for use in the process are of the duodeci type, i. e. having 12 coordinated groups to 1 nuclear group. The borotungstic compounds, which are very active hydration catalysts, apparently are a mixture of the duodeci and the nono types.

The heteropoly catalysts also may be used in the solid form, either alone or in association with other solid hydration catalysts such as alumina and thoria, by impregnation of the latter or by simple admixture. Likewise, these heteropoly catalysts may be deposited upon inert porous supports, such as silica gel, adsorbent carbon, or diatomaceous earth.

The important discovery has been made that by regulating the concentration of the heteropoly compound employed as catalyst, it is possible to secure high yields of the desired hydration products, while at the same time limiting undesirable polymerization of the olefins which is favored by the use of such catalysts as the strong sulfuric acids and phosphoric acids heretofore used. The use of the more dilute solutions of the heteropoly compounds not only makes possible high yields of the desired hydration products, but it minimizes these polymerization losses. On the other hand, it has been found that when employing solutions of these catalysts containing around 40 to 65% of the active catalyst, gas mixtures containing as low as 30% of olefins may be processed with good olefin hydration efficiencies and yields of alcohol and/or ether.

Where these dilute heteropoly catalysts are employed, pressures as high as 3000 pounds per square inch or even higher may be used, together with temperatures as high as 350° to 400° C., thereby enhancing the yields of alcohols without causing appreciable olefin polymerization. Where catalysts of lesser dilution are employed, or where practically pure olefin gas is hydrated, pressures and temperatures substantially below the above are satisfactory. In the vapor phase hydration of ethylene of from around 50 to 80% purity, operating pressures of from 300 to 4000 pounds per square inch preferably are used. The operating temperatures will range from 195° C., where pressures of 300 pounds per square inch are used, to above 300° C., at the higher pressures specified.

In propylene hydration it is desirable to utilize pressures within the range of from near atmospheric pressure up to 3000 pounds per square inch, since propylene may polymerize at higher pressures, particularly when there is a deficiency of water vapor in the heated mixture. The operating temperature will vary from around 105° C. in operations carried out at atmospheric pressure, to about 300° C. with the higher pressures.

The olefin-to-steam ratio may be varied from .30 to 4.00, but the most economic and practical ratios range from .67 to 2.00. While propylene of purity as low as 30% has been satisfactorily utilized, it is preferred to operate on propylene of at least 50 to 80% purity, the balance being propane or other inert gas, in order to enhance the yields and increase efficiencies and production ratios.

The following examples serve to illustrate various modifications of the invention. It will be understood, however, that the scope of the invention is not limited in any sense by the specific data appearing in these examples.

Example 1

A mixture of ethylene and steam in the ratio of 1.632 was bubbled through a 40% aqueous solution of phosphotungstic acid contained in a reaction zone maintained at 250° C. and under a pressure of 1000 pounds per square inch, at an outlet space velocity of 456 volumes of the mixed vapor per volume of reaction zone per hour. The outcoming reaction products were passed through a condenser, and the ethanol in the resultant condensate was separately recovered by fractional distillation. An overall yield of 4.69% of ethanol was secured, at an alcohol efficiency of 95.8%.

Example 2

Under conditions similar to those set out in Example 1, but utilizing a 40% aqueous solution of silicotungstic (hydrated) acid as catalyst, a mixture of ethylene and steam in the ratio of 1.187, and at a space velocity of 555 volumes per volume of reaction space per hour, gave an overall yield of 6.79% of ethanol and 1.2% of ethyl ether; at a production ratio of 72.6 grams of ethanol per liter of catalyst per hour.

Example 3

Following the general procedure of Example 1, a mixture of ethylene and steam in the ratio of .694 was passed through a 65% aqueous solution of hydrated silico-tungstic acid maintained at about 250° C., under a pressure of 1000 pounds per square inch. The reaction vapors had an outlet space velocity of 444 volumes per volume of reaction space per hour. An overall yield of 11.99% of ethanol, and of 5.58% of ethyl ether were obtained, at a production ratio of 133 grams of ethanol per liter of catalyst per hour.

*Example 4*

Under approximately similar conditions to those set out in Example 3, in a hydration conducted at 255° C., but using a 65% aqueous solution of phosphotungstic acid, an overall yield of ethanol of 7.58% and a yield of ethyl ether of .44% were obtained at an alcohol production ratio of 76.7 g. per liter of catalyst per hour.

*Example 5*

Following the general procedure of Example 1, a mixture of ethylene and steam in a ratio of .399 was bubbled through a 35% solution of cuprous phosphotungstate under the same conditions of pressure and temperature set out in Example 3. A substantial amount of ethanol was produced at a high ethanol efficiency.

*Example 6*

A gas mixture containing 30% propylene-70% propane was hydrated in the presence of a 70% aqueous solution of silicotungstic acid at a propylene:steam ratio of .38. The reaction zone was maintained under 1000 pounds per square inch pressure and at a temperature of 245° C. An overall yield of isopropanol of 6.02% was secured, with an isopropanol efficiency of over 86.9%, at a production ratio of 106 g. per liter of catalyst per hour.

*Example 7*

Following the general procedure of Example 1, a mixture of ethylene and steam in the ratio of .678 was passed through a reaction zone maintained at 270°–310° C. and under 750 pounds per square inch pressure, in the presence of alumina impregnated with silicotungstic acid. This catalyst was prepared by impregnating alumina with a dilute solution of the said acid, after which the water was evaporated. An overall ethanol yield of 2.26%, at an efficiency of 67.5% was obtained.

*Example 8*

Under conditions generally similar to those set out in Example 7, a mixture of propylene and steam in the ratio of .331, when reacted at a temperature ranging from 250–300° C. at a pressure of 500 pounds per square inch, yielded 4.34% of isopropanol at an efficiency of 76.2%.

*Example 9*

A mixture of propylene and steam in a ratio of .665 was passed over a 55–60% aqueous solution of borotungstic acid maintained at a temperature of 240° C., and under a pressure of 1000 pounds per square inch. An overall yield of 10.88 isopropanol was secured, with an efficiency of 99.9% at a production ratio of 847 grams of isopropanol per liter of catalyst per hour.

*Example 10*

A mixture of propylene and steam in a ratio of .619 was passed through a 67% aqueous solution of cadmium borotungstate, at a temperature of 225° C. and a pressure of 750 pounds per square inch. An overall yield of isopropanol of 10.27% was secured, with a production ratio of 551 grams per liter of catalyst per hour, and at a high efficiency.

The catalysts herein described also have considerable activity for the dehydration of alcohols and ethers, as well as for the hydration of ethers. Thus an alumina carrier impregnated with silicotungstic acid as hereinbefore described has functioned effectively as a catalyst for the dehydration of isopropanol to propylene at atmospheric pressure and temperatures within the range of from 150° to 200° C. Furthermore, ethyl ether has been hydrated to ethanol at atmospheric pressure in a reaction vessel containing a silicotungstic acid-treated alumina catalyst and maintained at about 280° C.

Activated alumina that has been treated with silicotungstic acid and then thoroughly washed with water is at least the equal or is superior to sulfuric acid-treated alumina for the hydration of ethyl ether. A mixture of ethyl ether and steam in a ratio of 0.177 was passed over the above-described silicotungstic acid-treated alumina catalyst in a reaction zone maintained at a temperature of 255° to 265° C. and at substantially atmospheric pressure. An overall yield of ethanol of 30.8% and an overall yield of 27.4% of ethylene were obtained, with a production ratio of 110 grams ethanol per liter of catalyst per hour. A run made under substantially similar conditions but using untreated activated alumina gave an overall yield of ethanol of 3.4% and a production ratio of 10.2 g. per liter of catalyst per hour.

Decomposed and reduced silicotungstic acid on alumina also is a very active solid catalyst for ether hydration. It may be prepared by highly heating to a decomposition temperature the impregnated alumina of the last-mentioned example.

As the olefin hydration system hereindescribed is a very effective ether hydration system as well, any or all of the ether formed in the process, or ether secured from any source and added to the olefins, can be converted into alcohol. This constitutes a very effective means for disposing of any excess of ethers by converting the latter into valuable, salable products.

In modifications of the invention in which uncondensed reaction products are recycled, a partial control of the amount of ether produced by the olefin hydration process may be effected satisfactorily by regulating the final temperature to which the recirculating reaction gases are cooled in condensing out the water-alcohol-ether mixture. If the gases are cooled to low temperatures a larger quantity of ether will be found in the liquid products. If higher temperatures are held in the condensers much of the ether will recirculate without being condensed and removed with the make. The equilibrium amount of ether which represents the maximum amount which might be present in the recirculated gases is relatively small so that it never greatly interferes with the primary olefin hydration reaction. By operating in this manner only a small amount of ether need be withdrawn from the process if desired. Of course this part which is unavoidably withdrawn can be returned to the cycle and hydrated to the alcohol if it is not desirable to produce ether.

Among the more or less insoluble salts of the heteropoly acids which may be employed as solid hydration catalysts may be mentioned the silver, caesium, and mercurous salts of the heteropoly acids, particularly those of silicotungstic and borotungstic acids.

The isopoly complex acids of tungsten, molybdenum, vanadium, chromium, sulfur, selenium, and tellurium, may be employed as substitutes for the heteropoly acids. Isopoly acids are acids in which the oxygen atoms of an acid containing combined oxygen are substituted by radicals of the same acid. (See Remys "Lehrbuch der Anorganischen Chemie", 1932, vol. 2, page 131). These isopoly acids are distinguished from the heteropoly acids in which the oxygen atoms of an acid containing combined oxygen are substituted by radicals of at least one different acid. Another type of isopoly acid possesses a structure identical with that of a heteropoly acid in which the nuclear position is occupied by hydrogen.

In many instances heteropoly acids which have been heated to temperatures sufficient to decompose and reduce them have served effectively as solid hydration catalysts, particularly for ether hydration.

The term "heteropoly compound" is used in the specification and claims to designate both the heteropoly acids and salts of the said acids. Likewise the terms "silicotungstic compound", borotungstic compound" and similar terms are used in the specification and claims to designate both the corresponding free acids, such as silicotungstic acid, and salts of the said acids.

The invention is susceptible of modification within the scope of the appended claims.

We claim:

1. A process of hydrating olefins, which comprises the step of reacting an olefin and water vapor at an elevated temperature and under superatmospheric pressure in the presence of a hydration catalyst essentially comprising a heteropoly acid.

2. A process for the production of alcohols, which comprises the step of reacting an olefin and water vapor at an elevated temperature and under superatmospheric pressure in the presence of a hydration catalyst essentially comprising a heteropoly acid, one component element of which is selected from the elements of sub-group A of the sixth group of the Periodic Table.

3. Hydration process, which comprises the steps of reacting water vapor and a compound selected from the group consisting of olefins and aliphatic ethers at an elevated temperature, in the presence of a hydration catalyst essentially comprising a compound selected from the group consisting of heteropoly acids, the salts of the said acids, and isopoly acids.

4. Hydration process which comprises the steps of reacting a compound selected from the group consisting of olefins and aliphatic ethers with water vapor at elevated temperature in the presence of a hydration catalyst essentially comprising a solution of a compound selected from the group consisting of heteropoly acids, the salts of the said acids, and isopoly acids.

5. Catalytic hydration process which comprises reacting an aliphatic ether with water vapor at an elevated temperature in the presence of a hydration catalyst essentially comprising a heteropoly compound.

6. A process of hydrating olefins in the vapor phase, which comprises the step of reacting an olefin and water vapor by passing same at an elevated temperature and at superatmospheric pressure over a hydration catalyst comprising essentially a heteropoly acid supported on a porous supporting material.

7. A process of hydrating olefins in the vapor phase, which comprises the step of reacting an olefin and water vapor by passing same at an elevated temperature and at superatmospheric pressure over a hydration catalyst comprising essentially a heteropoly acid supported on an inert porous supporting material.

8. A process for the production of alcohols, which comprises the step of reacting an olefin and water vapor at an elevated temperature and under superatmospheric pressure in the presence of an inert gas and of a hydration catalyst essentially comprising a heteropoly acid, one component element of which is selected from the elements of sub-group A of the sixth group of the Periodic Table.

9. A process for the production of alcohols, which comprises the steps of reacting an olefin and water vapor at an elevated temperature and under superatmospheric pressure in the presence of a hydration catalyst essentially comprising a heteropoly acid, one component element of which is selected from the elements of sub-group A of the sixth group of the Periodic Table, separating unreacted olefin from the resultant reaction mixture, and recycling the olefin in the process.

10. Process of hydrating olefins, which comprises the steps of reacting an olefin and water vapor at elevated temperatures in the presence of a borotungstic compound.

11. Process of hydrating olefins, which comprises the steps of reacting an olefin and water vapor at elevated temperatures in the presence of a silicotungstic compound.

12. A process of hydrating olefins, which comprises the step of reacting an olefin and water vapor at an elevated temperature and under superatmospheric pressure in the presence of a hydration catalyst essentially comprising silicotungstic acid.

13. A process for the production of alcohols, which comprises the step of reacting an olefin and water vapor at an elevated temperature and under superatmospheric pressure in the presence of a hydration catalyst essentially comprising silicotungstic acide.

14. A process of hydrating olefins, which comprises the step of reacting an olefin and water vapor at an elevated temperature and under superatmospheric pressure in the presence of a hydration catalyst essentially comprising phosphotungstic acid.

15. A process for the production of alcohols, which comprises the step of reacting an olefin and water vapor at an elevated temperature and under superatmospheric pressure in the presence of a hydration catalyst essentially comprising phosphotungstic acid.

16. Catalytic hydration process for the production of alcohols and ethers by the hydration of olefins, according to which a catalyst is used essentially comprising a dilute solution of a heteropoly compound.

17. Process of hydrating olefins, which comprises the steps of reacting an olefin and water vapor at elevated temperatures in the presence of a hydration catalyst essentially comprising a solution of a heteropoly acid.

18. Process of hydrating olefins, which comprises the steps of passing a vaporous mixture containing an olefin and at least an equivalent amount of water vapor through an aqueous solution of a heteropoly compound within a reaction zone maintained at elevated temperatures and under superatmospheric pressure, and recovering the resultant reaction products.

19. Process of hydrating olefins, which comprises the steps of passing a vaporous mixture of water vapor and an olefin diluted with a gaseous medium that is not reactive under the operating conditions through an aqueous solution of a heteropoly compound within a reaction zone maintained at an elevated temperature and under superatmospheric pressure, and recovering the resultant reaction products.

20. Process of hydrating olefins, which comprises the steps of passing a vaporous mixture containing an olefin and at least an equivalent amount of water vapor through an aqueous solution of a heteropoly compound within a reaction zone maintained at temperatures within the range of from about 105° C. to about 400° C. and at pressures ranging from atmospheric to around 5000 pounds per square inch.

21. Catalytic hydration process for the production of alcohols and ethers by the hydration of olefines, according to which a catalyst is used essentially comprising a dilute solution of a borotungstic compound.

22. Catalytic hydration process for the production of alcohols and ethers by the hydration of olefines, according to which a catalyst is used essentially comprising a dilute solution of a silicotungstic compound.

23. Process for the catalytic hydration of olefins in which a catalyst is used essentially comprising a dilute solution, in a liquid which is not reactive under the operating conditions, of a heteropoly compound containing in a nuclear group thereof an oxide of phosphorus.

24. Process of hydrating ethylene, which comprises passing a vaporous mixture containing ethylene and water vapor into contact with a heteropoly compound within a reaction zone maintained at a temperature within the range of from 195° C. to 300° C., and under a pressure of from 300 to 4000 pounds per square inch, and recovering the resultant reaction products.

25. The process as defined in claim 24, in which the said vaporous mixture is composed of water vapor and a hydrocarbon mixture containing 30 to 80% ethylene, the balance thereof being a gaseous medium that is not reactive under the said operating conditions.

26. Process as defined in claim 24, according to which the said vaporous mixture is passed through a dilute solution of the said catalyst in an inert liquid.

27. Process of hydrating propylene, which comprises the steps of passing a vaporous mixture containing propylene and water vapor into contact with a heteropoly compound within a reaction zone maintained at a temperature within the range of from around 105° to around 260° C., and at a pressure within the range from around atmospheric pressure to 3000 pounds per square inch, and recovering the resultant reaction products.

28. Process as defined in claim 27, wherein the said vaporous mixture is passed through a solution of a heteropoly compound containing from 40 to 70% of the said compound.

29. Process as defined in claim 27, wherein the said vaporous mixture contains water vapor and a propylene-containing gas comprising around 30 to 80% of propylene, and 20 to 70% of a gas which is not reactive under the operating conditions.

JAMES F. EVERSOLE.
CHARLES W. REHM.